1,577,553

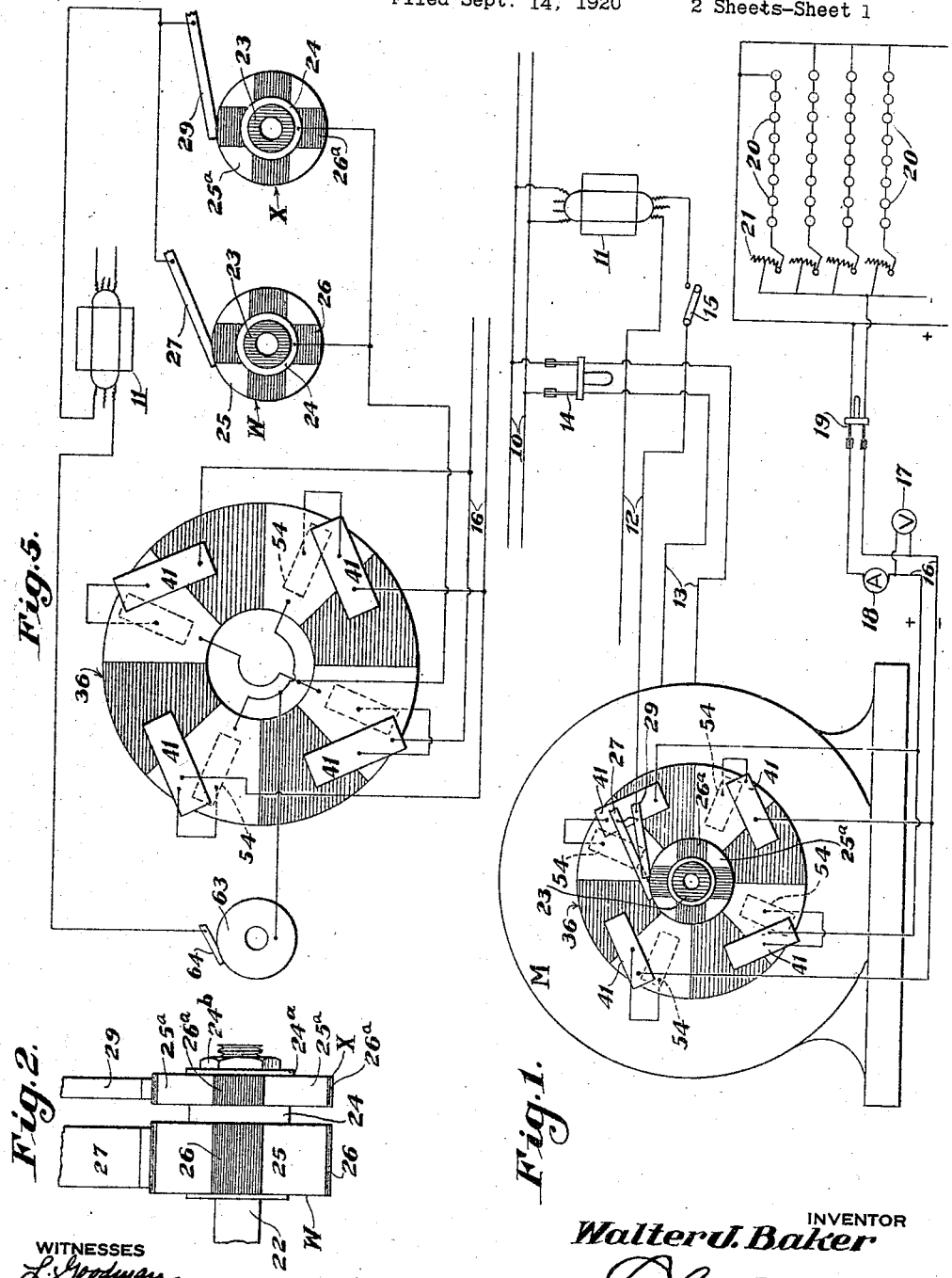
March 23, 1926.
W. J. BAKER
1,577,553
ROTARY RECTIFIER
Filed Sept. 14, 1920    2 Sheets-Sheet 1
INVENTOR
Walter J. Baker
BY
ATTORNEY March 23, 1926.
W. J. BAKER
1,577,553
ROTARY RECTIFIER
Filed Sept. 14, 1920    2 Sheets-Sheet 2
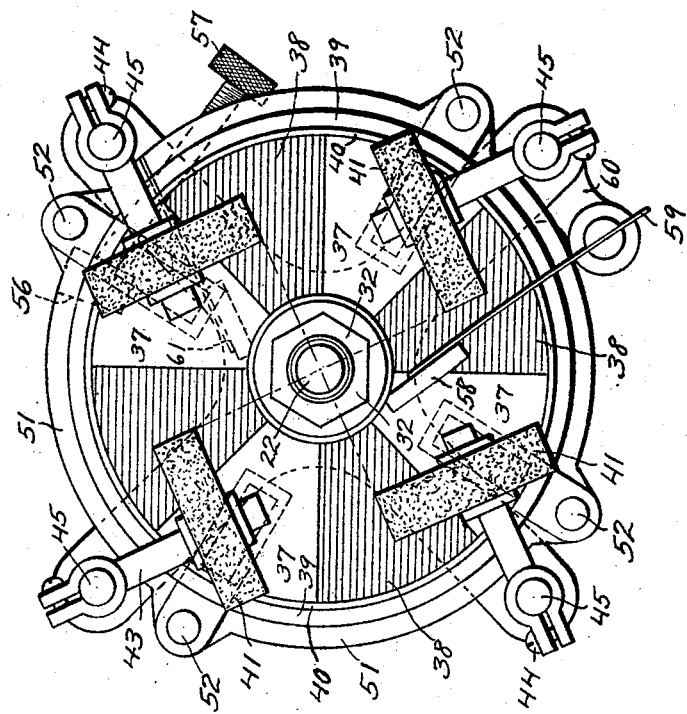
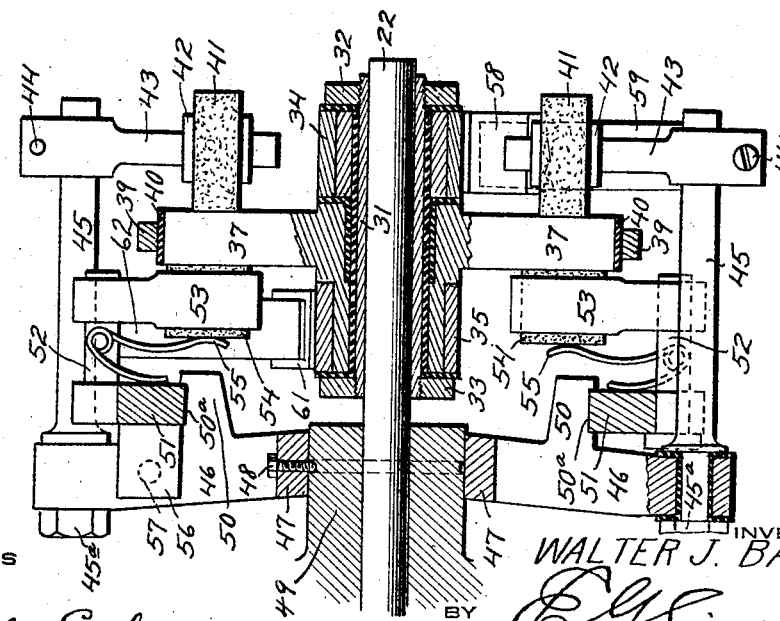
WITNESS
Philip E. Siggers
INVENTOR
WALTER J. BAKER
BY
ATTORNEY Patented Mar. 23, 1926.

UNITED STATES PATENT OFFICE.

WALTER J. BAKER, OF CHILLICOTHE, MISSOURI.

ROTARY RECTIFIER.

Application filed September 14, 1920. Serial No. 410,143.

*To all whom it may concern:*

Be it known that I, WALTER J. BAKER, a citizen of the United States, residing at Chillicothe, in the county of Livingston and State of Missouri, have invented a new and useful Rotary Rectifier, of which the following is a specification.

This invention relates to apparatus for rectifying alternating current.

The general object of the invention is to provide an improved rectifying apparatus which will deliver continuous current of a nature suitable for charging automobile storage batteries and like work.

More specific objects are to provide a rectifier of the rotary type which shall operate as nearly as possible without sparking, which is adjustable to meet various service conditions to reduce sparking to a minimum, and which localizes the firing, arcing or sparking that does occur to a particular element which is readily removable.

Another object is to provide in a rectifier for charging batteries means whereby only the heavier rectified current which has an E. M. F. greater than the counter E. M. F. from the batteries is sent out from the machine.

A further object is to provide in a rotary rectifier an improved disk commutator which reduces the chances of any flashing over to a minimum, which provides a large bearing surface for the brushes and permits shifting thereof, which is kept cool and is accessible for repairs or dismantling.

A still further object is to provide novel means for holding two sets of brushes, one set on either side of the disk commutator, which means allows adjusting of the positions of the sets relatively.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a somewhat diagrammatic view of a single phase rotary rectifier shown connected to a series of batteries for charging the same.

Fig. 2 is a front elevation of the interrupter and the feeding brushes therefor which are employed in the machine of Fig. 1.

Fig. 3 is an elevation of a modified rectifier employing slip rings instead of the interrupter of Figs. 1 and 2.

Fig. 4 is a diametric sectional view with parts in elevation of the apparatus of Fig. 3.

Figure 5 is a diagrammatic illustration showing the rotating portions of the device and the electrical connections for the same.

The apparatus shown in Fig. 1 employs a single phase synchronous motor driven by alternating current of moderate voltage and carrying on its shaft a disk commutator and an interrupter. The interrupter is connected with a transformer, in turn connected with the main lines which supply driving current for the motor. The interrupter is segmental and its segments are electrically connected with each alternate segment of the disk commutator. Brushes bear against each side of the disk commutator and take off direct current which is conducted to a series of batteries or is otherwise employed. It will be understood that the single phase motor may be replaced by a three-phase machine, the former having been shown in the drawings only because of the simplicity of the electrical connections. Whatever motor is employed should be of the self-starting type.

In Fig. 1, the synchronous motor is shown without brush-holding means. This view being diagrammatic, it will be understood that the brush-holding means illustrated in some detail in Figs. 3 and 4 is to be employed with the machine of Fig. 1. In Figs. 3 and 4, the exterior circuit is omitted. It will be understood that the machine of these two figures is to be connected in circuit in a manner similar to the machine of Fig. 1, the only difference being that alternating current is led to the slip rings in the construction of Fig. 3 instead of to an interrupter, as in the construction of Fig. 1.

The numeral 10 represents the two single phase supply mains. 11 is a transformer. The current carried by the mains 10 may be of moderate voltage, such as 110 or 220 V., and this current is stepped to 70 V. by the transformer 11, conductors 12 leading the 70 V. alternating current to the rectifier. The synchronous motor M preferably is built for operating upon a moderately low voltage, as 110 or 220 V., and 25 or 60 cycle current, at a moderate speed as 900 or 1800 R. P. M. The motor M is shown connected with the supply mains 10 by the leads 13. A double pole switch 14 permits the motor circuit to be broken. One of the conductors 12 has a single pole switch 15, so that the circuit including the rectifying portion of the apparatus may be broken. Leading from the disk commutator brushes are conductors 16 which carry direct current from the rectifier to the batteries. The ammeter 18 and volt meter 17 are placed in the D. C. circuit and a knife switch 19 is also employed so that said circuit may be broken. A number of storage cells 20 are shown in the D. C. circuit. For a direct current of 70 V., there may be eight 6 V. batteries arranged in series with each other and four or more of these series in parallel. A rheostat 21 is connected with each series of batteries so as to regulate the charging current. The proper reverse current cut-out fuse switches should be included in the D. C. circuit, but these, being unnecessary for a complete understanding of the invention, have been omitted from the drawing.

The motor shaft is indicated by the numeral 22. Upon one end of this shaft an insulating sleeve 23 is mounted. In surrounding relation to the insulating sleeve 23 is a copper sleeve 24. On the sleeve 24 are mounted what may be termed a primary interrupter W and a secondary interrupter X. The primary interrupter W is made up of a copper body in contact with the sleeve 24, and having integral copper wings or segments 25 between which are segmental inserts 26 of mica, or other insulating material. The secondary interrupter X is comparatively thin, but is otherwise similar to the primary interrupter, being made up of copper wings or segments 25$^a$ between which are segmental inserts 26$^a$ of insulating material. The secondary interrupter X is removably held in position by a washer 24$^a$ and a nut 24$^b$, the latter having a threaded connection with the shaft 22. A brush 27 bears upon the periphery of the primary interrupter W, and is nearly equal in width thereto. An auxiliary brush 29 bears upon the peripheral face of the secondary interrupter X, and is arranged, as seen in Figures 1, 2 and 5, slightly in advance of brush 27 and electrically connected thereto.

In the drawing, the interrupters are each shown as composed of four copper segments and four mica segments. This design is necessary for a current frequency of 60 cycles applied to a synchronous motor of 1800 R. P. M. With a different speed motor of say 900 R. P. M., interrupters having eight segments of copper and eight segments of insulating material would be required. Fig. 1 of the drawing shows a rectifying commutator 36. For a complete understanding of the construction of this commutator, reference should be made to Figs. 3 and 4. The commutator 36 is a disk-like member of enlarged size compared with the interrupters, and is secured upon the shaft 22 to rotate in a vertical plane. The interrupters collector and commutator are mounted to turn with the motor shaft and are mechanically secured, so that relative rotation or other movement is impossible. The commutator and interrupters may be mounted on the same end of the motor shaft, or may be supported at opposite ends. The commutator is composed of four copper segments, and four mica segments, each comprising an angle of 45°. In case of a motor having 900 R. P. M., it will be necessary to employ a commutator having eight copper segments. The commutator is preferably built of two interfitting parts, each part comprising a hub portion with two opposite copper segments and two opposite mica segments, either copper segment being in juxtaposition to a mica segment. The opposite copper segments are electrically connected through the hub portion. The numeral 37 denotes the copper segments of the commutator and 38 represents the mica segments. The two portions of the commutator are held together by a clamping or binding ring 39 which passes about the periphery of the commutator and holds the segments of the disk against separation under centrifugal stresses. An insulating band 40 is interposed between the clamping ring 39 and the periphery of the commutator.

It is to be particularly noted that neither the primary interrupter W or the secondary interrupter X is a commutator, either in construction or function. The adjacent segments of a true commutator are insulated from each other, whereas the copper parts of the two interrupters are electrically connected to each other and to the copper sleeve 24.

The apparatus of Figs. 3 and 4 employs a pair of slip rings 34 and 35 in place of the interrupters shown in Figs. 1 and 2. These slip rings are insulated from the shaft 22 and from each other. An insulated sleeve 31 is employed which is screw-threaded at each end, and nuts 32 and 33 mounted upon the screw-threaded ends hold the two slip rings in position. Each slip ring is electrically connected with a pair of opposite copper segments 37.

A compound rocker is employed for holding the brushes which take direct current from the faces of the disk commutator. This rocker will now be described. An annular member 47 fits over the hub 49 of the motor and is adjustably secured thereon by set screws 48 passing therethrough and entering an annular groove provided in the hub. A plurality of rocker arms 46 extend outwardly from the annular member 47, there being as many of these rocker arms as there are copper segments in the commutator. At the outer ends of the rocker arms 46, studs 45 are secured, preferably by nuts 45ª, studs 45 being, however, insulated from the rocker arms 46. The studs 45 extend at right angles to the arms 46 and themselves carry brush-holding arms 43. Clamping screws 44 are provided to permit adjustment of brush-holding arms 43 upon the studs 45. The arms 43 carry brushes 41 of any material, as graphite or copper. The manner in which the brushes 41 are held upon the arms 43 forms no part of the present invention, and hence no particular brush-securing means is shown. The brush holders 42 illustrated may be considered as merely indicative of any brush holder now on the market. The brushes 41 are rectangular, as shown. Opposite brushes 41 are connected to each other by cables as shown in Figures 1 and 5 so that direct current of the same polarity is obtained from opposite brushes. Preferably, the forward ends of the brushes 41 lie in planes radial with respect to the commutator so that the entire width of the brushes 41 makes initial contact with the copper segments of the commutator at the same instant.

Each rocker arm 46 has an extension 50 at right angles thereto and a groove 50ª provided on the outer edge of each extension 50. An annular member 51 is seated in the groove 50ª and thus may be turned relative to the rocker arms 46. At a convenient point, the annular member 51 has a lug 56 with which engages an adjusting screw 57. This screw also passes through one of the rocker arms 46. The annular rocker member 51 carries a series of studs 52 corresponding to the studs 45 and having a short length. Brush-holding arms 53 are mounted in any desirable way upon the outer ends of the studs 52 and carry brushes 54. Springs 55 press brushes 54 against the inner face of the commutator 36. As seen in Fig. 3, the brushes 54 are rectangular though smaller than the brushes 41 and are set so that one longitudinal edge thereof lies in a plane radial with respect to the disk commutator. Each of the brushes 54 bears upon the face of the commutator opposite from that upon which brushes 41 bear. The relative positions of the brushes on opposite sides of the commutator are also disclosed in Fig. 1. Each brush 54 is electrically connected with the nearest brush 41 on the opposite side of the commutator by any convenient means, as by a cable shown diagrammatically in Figure 1. Thus, adjacent brushes 54 and 41 together form a single brush, since the two bear upon the same segment of the commutator during approximately the same interval of time. The arc of contact of each pair of brushes 54 and 41 is equal to the arcuate distance from the rear end of brush 54 to the forward end of brush 41. Obviously, turning of the screw 57 causes circumferential movement of the rocker element 51 and with it the brushes 54. This either increases or decreases the arc of contact of the adjacent brushes 41, 54, which electrically form a single brush. Proper adjustment is made by advancing or retarding the brushes 54 so as to remain in contact with a copper segment of the commutator only during so much of its travel as the segment maintains its potential above the counter E. M. F. of the series of batteries being charged. Then the insulating segment approaches, opening the circuit. The next alternation is acted upon in a similar manner, both alternations of the cycle being rectified, but only so much of the rectified current being led off from the brushes as has a voltage greater than the potential of the batteries.

In the form illustrated in Figures 3 and 4, the alternating current is led into the rectifier from the transformer by means of brushes 58 and 61, the brush 58 making contact with slip ring 34 and the brush 61 pressing against the periphery of slip ring 35. The brushes 58 and 61 are maintained pressed against the peripheries of the slip rings with some tension by springs 59 and 62, respectively, these springs being secured at their outer ends upon clamping arms 60, one of these being shown in Fig. 3. The arms 60 are connected with the main rocker frame comprising the arms 46.

In the form shown in Figures 1, 2 and 5, a ring 63 is secured to the shaft 22 so as to rotate with the commutator 36 and interrupters W and X. One lead from the transformer is connected through the brushes 27 and 29, which are electrically parallel, and segments 25 and 25ª of interrupters W and X, which are electrically connected to each other but insulated from the shaft 22, to alternate segments of the commutator, and thence through brushes 41 and 54 to one pole of the battery 20, while the other lead is connected through a brush 64 and ring 63 to the other segments of the commutator, and thence to the other pole of the battery. As the shaft 22 rotates, therefore, the alternating current is fed through alternate segments of the commutator 36, and the rectified current is impressed on the battery.

The theory of operation and the advantages of the apparatus which has been described will be readily understood. The wide 45° insulation prevents the battery from discharging back through the system, all the brushes during the period of low voltage passing over the mica segments so that the main circuit to the batteries is open. It will be understood that it is not absolutely necessary for the mica segments to be exactly 45° wide. There may be some variation in the width of the segments.

Most rectifying commutators in use have a very decided characteristic of sparking at the brushes, which sparking, if allowed to continue, rapidly becomes very destructive and necessitates disassembling of parts of the machine and putting them on a turning lathe. Such commutators are usually large and more or less difficult and expensive to repair. In the preferred form of the present invention as shown in Figures 1, 2 and 5, wherein a primary and a secondary interrupter are used, the sparking is confined to the secondary interrupter, which is a very simple and inexpensive element. This localization of the sparking is a great advantage. The smoothing down of an accessible and very small ring such as the ring X is incomparably easier than to repair a large segmental commutator.

The commutator being arranged in the form of a relatively thin disk is exposed on both sides to the cooling action of the air and the rotation of the disk causes the current of air to flow constantly outward due to the centrifugal action thereof. In case of a flash-over on the commutator, such air current acts to blow the arc out toward the periphery of the commutator away from the slip ring, thus exerting a cooling tendency on the arc and effecting a quicker extinguishment of the same. The relatively large commutator disk provides a wide surface, allowing the use of relatively large brushes so that a heavier load may be carried than is possible with other types of rectifiers of the same size. The amount of shaft extension, and therefore the amount of overhanging load, is considerably reduced by the use of a flat disk commutator instead of a cylindrical commutator. Ample space is provided on the commutator to permit of increase of width and thickness of the brushes to carry approximately double the amperage, if desirable. Room is left to shift the brushes radially to a new working surface on the commutator. This allows a longer period to elapse until re-surfacing or truing of the commutator becomes necessary. The very wide insulation between the commutator segments causes a rapid drawing out of any arc that might flash over from one segment to the other, and so rapidly weakens the arc that little or no burning of the commutator may take place. A still further advantage in the present construction is the accessibility of the rectifier parts. By swinging the arms 43 out of the way and unscrewing the nut 32, the disk commutator can be taken off.

The brushes 41 may be set and adjusted to operate in a sparkless manner under practically all conditions of service. If sparks or flashes do occur, they will be at the outer portions of the segments where the same are very wide and where little harm can result.

It will be understood that instead of charging batteries, the present apparatus may be used for arc light projectors for motion pictures or other similar circuits. From one to six series of eight 6 V. batteries may be connected to the two main D. C. wires, the load limit being determined by the brush-carrying capacity. In the described apparatus, eight brushes are shown, two pairs being connected together in parallel; thus the current-carrying capacity is very large and a heavy current will be accommodated before any heating at the points of contact will occur. The apparatus will operate satisfactorily with any two adjacent pairs of brushes removed, such removal only decreasing the capacity of the machine.

What is claimed is:—

1. A rectifying device comprising a synchronous motor, mains to which said motor is directly connected, a commutator rotated by the shaft of said motor, an interrupter mounted on the same shaft and electrically connected with said commutator, means for delivering alternating current from the mains to the interrupter, and means for taking off direct current from the commutator, said interrupter being so arranged as to interrupt the current during each cycle before the brushes of the commutator leave the conductive segments thereof.

2. A rectifying device comprising a synchronous motor, a commutator rotated by the shaft of said motor, said commutator comprising a disk composed of arcuate segments of approximately equal size, half of said segments being conductors and the other half being insulators alternating therewith, a primary interrupter and a secondary interrupter mounted on the same shaft with the commutator, a brush conducting alternating current to said primary interrupter, a brush conducting current from the same source to the secondary interrupter but set so as to break the contact later than the first mentioned brush, the two brushes being electrically parallel, and means electrically connecting all the conductive parts of the primary and secondary interrupters with each other and with alternating conductive segments of the commutator.

3. A rectifying device comprising a synchronous motor, a commutator rotated by the shaft of said motor, said commutator comprising a disk composed of arcuate segments of approximately equal size, half of said segments being conductors and the other half insulators alternating therewith, an interrupter mounted on the same shaft and electrically connected with alternate segments of the commutator, means for delivering alternating current to the interrupter, and means for taking off direct current from the commutator, said interrupter being so arranged as to interrupt the current during each cycle slightly before the brushes of the commutator leave the conductive segments thereof.

4. A rectifying device comprising a synchronous motor, a commutator rotated by the shaft of said motor, a primary interrupter and a secondary interrupter likewise rotated and electrically connected to each other, means for delivering alternating current to the interrupters, the source of said alternating current also providing the power by which the motor is run, and means connecting the primary interrupter to certain of the conducting segments of the commutator, whereby the alternating current is rectified and pulsating direct current may be lead off by means of brushes in contact with the commutator.

5. A rectifying device comprising, in combination, a synchronous motor, a disk commutator mounted on the motor shaft and composed of segments which are alternately conductors and non-conductors, a primary interrupter and a secondary interrupter mounted on said shaft and each comprising a disk composed of segments alternately conductors and non-conductors, the conductive segments of the interrupters being electrically connected to each other, and to at least two segments of the commutator.

6. A rectifying device, comprising, in combination, a primary interrupter, a secondary interrupter and a commutator, a synchronous motor for rotating all of said elements in unison, a brush conducting alternating current to said primary interrupter, a second brush conducting current from the same source to the secondary interrupter but set so as to make and break the current in advance of the first mentioned brush, the two brushes being connected in parallel, and means electrically connecting all conductive parts of both interrupters with each other and with certain of the segments of the commutator.

7. A rectifying device, comprising, in combination, a primary interrupter and a secondary interrupter electrically connected to each other, a commutator, a synchronous motor for rotating said interrupters and commutator in unison, said secondary interrupter being mounted on the motor shaft and readily removable therefrom, and brushes conducting the alternating current to the primary and the secondary interrupters separately, the brush to the secondary interrupter being set to make and break the current later than the other brush, whereby all sparking is localized on the secondary interrupter.

8. A rectifying device, comprising, in combination, a primary interrupter and a secondary interrupter, a commutator, a synchronous motor rotating all of said parts in unison, said primary and secondary interrupters each being in the form of a disk which is a good conductor and has insulating segments set into its periphery, all of the conductive parts of both interrupters being electrically connected, the secondary interrupter being considerably thinner than the primary interrupter, a brush conducting alternating current to each interrupter disk, the brush for the secondary interrupter being held so as to make and break the current later than the brush to the primary interrupter, and electrical conducting means connecting the interrupter disks to half of the conducting segments of the commutator.

9. In rectifying apparatus, a disk commutator, a synchronous motor rotating the commutator, a compound rocker adjustably mounted on the motor and comprising a fixed and a movable rocker part, a set of brushes carried by each rocker part with each set bearing against the opposite faces of the commutator, and means for effecting adjustment of the movable rocker part relative to the fixed rocker part.

10. In rectifying apparatus, a disk commutator, a synchronous motor rotating the commutator, a compound rocker adjustably mounted on the motor and comprising a fixed and a movable rocker part, a set of brushes carried by each rocker part with each set bearing against the opposite faces of the commutator, the brushes of one set opposing the brushes of the other set so that each brush has a corresponding brush on the other side of the commutator bearing against the same commutator segment, means for electrically connecting opposed brushes, and means for effecting adjustment of the movable rocker part relative to the fixed rocker part.

11. In rectifying apparatus, a disk commutator, a synchronous motor rotating the commutator, a compound rocker adjustably mounted on the motor and comprising a fixed and a movable rocker part, a set of brushes carried by each rocker part with each set bearing against the opposite faces of the commutator, the brushes of one set being considerably larger than the brushes of the other set and the forward edges of all the brushes extending in planes substantially radial with respect to the commutator, opposed brushes being connected in series with each other, and means for effecting adjustment of the movable rocker part relative to the fixed rocker part.

12. Rectifying apparatus including a disk commutator, a synchronous motor rotating the commutator, a compound rocker adjustably mounted on the motor hub and including two parts, one movable relative to the other, the fixed rocker part having extension arms each provided with a slot, the movable rocker part including an annular member seated in the slots of the extension arms, a slow motion adjusting element connected to both parts of the rocker to effect relative adjustment thereof, and a set of brushes carried by each rocker part with the brushes of each set bearing at opposed points against the opposite faces of the commutator.

In testimony that I claim the foregoing as my own, I have hereto affixed my signature.

WALTER J. BAKER.